(12) United States Patent
Poole et al.

(10) Patent No.: US 10,144,068 B1
(45) Date of Patent: Dec. 4, 2018

(54) SELF-ADJUSTING POCKET HOLE JIG

(71) Applicants: Robert N. Poole, Coronado, CA (US);
Daniel L. Poole, Glendale, AZ (US);
Michael G. Asimakis, Scottsdale, AZ (US)

(72) Inventors: Robert N. Poole, Coronado, CA (US);
Daniel L. Poole, Glendale, AZ (US);
Michael G. Asimakis, Scottsdale, AZ (US)

( * ) Notice: Subject to any disclaimer, the term of this patent is extended or adjusted under 35 U.S.C. 154(b) by 0 days.

(21) Appl. No.: 15/824,973

(22) Filed: Nov. 28, 2017

Related U.S. Application Data

(63) Continuation-in-part of application No. 15/683,525, filed on Aug. 22, 2017.

(60) Provisional application No. 62/378,337, filed on Aug. 23, 2016.

(51) Int. Cl.
*B23B 47/28* (2006.01)

(52) U.S. Cl.
CPC ........ *B23B 47/287* (2013.01); *B23B 2247/10* (2013.01); *B23B 2247/12* (2013.01)

(58) Field of Classification Search
CPC . B23B 47/28; B23B 2247/10; B23B 2247/12; B25B 1/00; B25B 5/00
USPC ............................ 269/43, 156, 291; 29/281.1
See application file for complete search history.

(56) References Cited

U.S. PATENT DOCUMENTS

| | | | | |
|---|---|---|---|---|
| 6,637,988 B1* | 10/2003 | Park | ...................... | B23B 47/287 408/103 |
| 7,641,425 B2* | 1/2010 | Sommerfeld | ......... | B23B 47/287 269/224 |
| 9,969,011 B1* | 5/2018 | Marusiak | .............. | B23B 47/287 |
| 2005/0089381 A1* | 4/2005 | Liu | ........................ | B23B 47/287 408/115 R |
| 2014/0341665 A1* | 11/2014 | Clark | ................. | B23Q 11/0042 408/67 |
| 2015/0033514 A1* | 2/2015 | Poole | ...................... | B25B 5/068 24/524 |
| 2018/0141133 A1* | 5/2018 | Clark | .................... | B23B 47/287 |

* cited by examiner

*Primary Examiner* — Daniel Howell
*Assistant Examiner* — Chwen-Wei Su
(74) *Attorney, Agent, or Firm* — Parsons & Goltry; Robert Parsons; Michael Goltry

(57) ABSTRACT

A pocket hole jig including a base having a clamp end and a toggle end, a guide carried by the base intermediate the clamp end and the toggle end and a clamp assembly carried by the base intermediate the clamp end and the guide, and reciprocally movable between an engaged position when moved toward the guide and a disengaged position when moved away from the guide. The clamp assembly includes a carriage slidably carried by the base, a clamp arm extending above and carried by carriage, a foot coupled to the clamp arm for engaging a workpiece, and a platform extending from the carriage overlying the base for receiving a workpiece and preventing the workpiece from contacting the base.

20 Claims, 14 Drawing Sheets

US 10,144,068 B1

SELF-ADJUSTING POCKET HOLE JIG

CROSS-REFERENCE TO RELATED APPLICATION

This application claims the benefit of U.S. patent application Ser. No. 15/683,525, filed on Aug. 22, 2017, which claims the benefit of U.S. Provisional Patent Application No. 62/378,337, filed 23 Aug. 2016.

FIELD OF THE INVENTION

This invention relates to pocket hole jig tools, and more specifically to pocket hole jig tools that are self-adjusting.

BACKGROUND OF THE INVENTION

Pocket hole joinery is used extensively in woodworking as a quick and easy way to join two wood workpieces. A pocket hole is a pilot hole drilled at an angle in a first wood workpiece to align a screw for fastening to a second workpiece. A step drill creates a counterbored hole, or pocket, for the head of the pocket screw and a smaller diameter for body clearance. The counterbore or pocket of the pocket holes receive the pocket hole screw heads, hiding them in the internal, underside construction areas of woodworking projects.

It is important for the pocket hole to be drilled to the correct height in a workpiece. If the height is too small, the screw will stick through the surface of the joined part. If the height is too big, the joint will not be as strong as it should be. The correct pocket height will be different for different thickness of wood and different screw lengths.

Currently, various jigs have been provided for assisting in the drilling of pocket holes. However, precision and correctly measuring placement of the hole in a workpiece is important. Current jigs are useful in correctly forming holes in a workpiece, but they require extensive measurements during positioning of a workpiece or extensive trial and error to find the correct placement.

It would be highly advantageous, therefore, to remedy the foregoing and other deficiencies inherent in the prior art.

SUMMARY OF THE INVENTION

Briefly, to achieve the desired objects and advantages of the instant invention, provided is a pocket hole jig including a base having a clamp end and a toggle end, a guide carried by the base intermediate the clamp end and the toggle end, and a clamp assembly carried by the base intermediate the clamp end and the guide. The clamp assembly is reciprocally movable between an engaged position when moved toward the guide and a disengaged position when moved away from the guide, and includes a carriage slidably carried by the base, a clamp arm extending above and carried by carriage, a foot coupled to the clamp arm for engaging a workpiece, and a platform extending from the carriage overlying the base for receiving a workpiece and preventing the workpiece from contacting the base. An adjustment mechanism is coupled to the clamp assembly to move the clamp assembly in a forward direction to the engaged position and in a rearward direction to the disengaged position.

In a specific aspect of the invention, the pocket hole jig includes the guide carried by the base being reciprocally movable between a raised position and a lowered position, the guide including at least one guide channels. A guide holder extends upwardly from the base intermediate the clamp end and the toggle end to receive and retain the guide for reciprocal movement between the raised position and the lowered position. The guide has a clamp surface extending beyond the guide holder to engage a workpiece and prevent a workpiece from engaging the guide holder.

In a further aspect, the adjustment mechanism further includes a translation mechanism coupled between the guide and the clamp assembly. The translation mechanism is configured to move the guide in a downward direction to the lowered position when the clamp assembly is moved in a forward direction, and configured to move the guide in an upward direction to the raised position when the clamp assembly is moved in a rearward direction.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
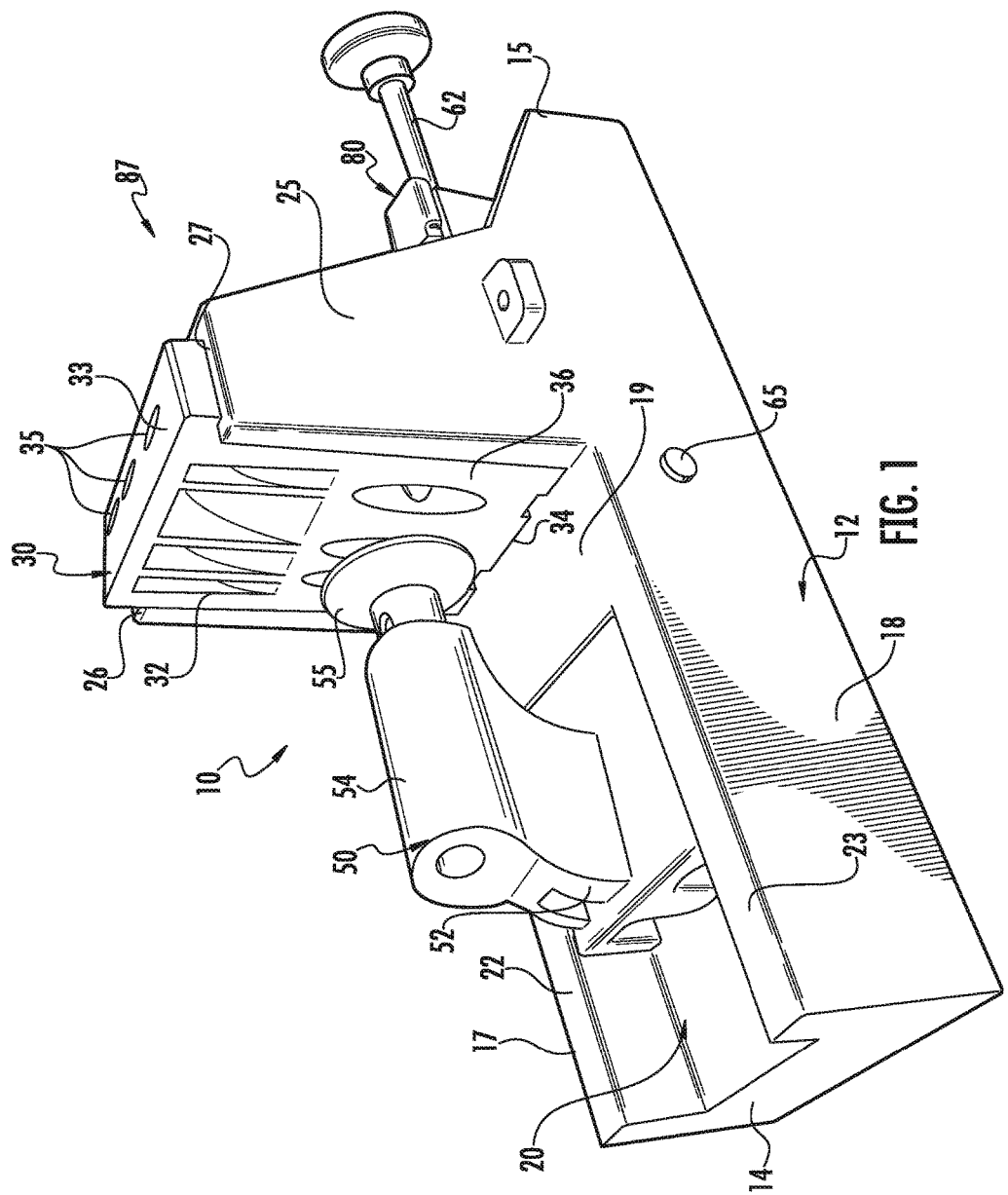
FIG. 1 is a perspective view of a self-adjusting pocket hole jig accordance with the present invention, in a lowered position.
Figure 2:
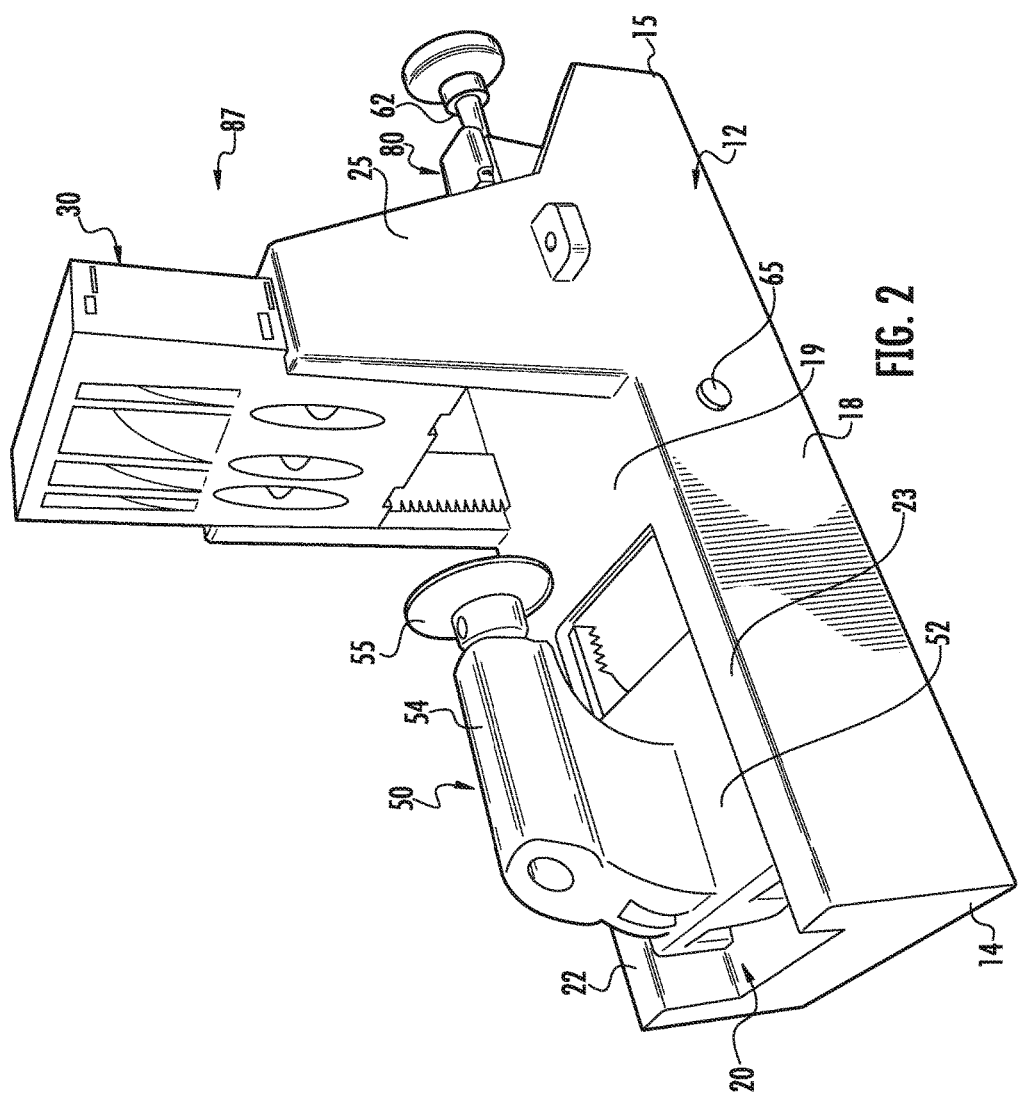
FIG. 2 is a perspective view of the self-adjusting pocket hole jig of FIG. 1, in a raised position.

Turning now to the drawings in which like reference characters indicate corresponding elements throughout the several views, attention is first directed to FIGS. 1 and 2 which illustrate a self-adjusting pocket hole jig, generally designated 10, in accordance with the present invention. Jig 10 includes a base 12 having a clamp end 14, a toggle end 15, opposing sides 17 and 18, and a platform 19 extending from side 17 to side 18 and positioned intermediate clamp end 14 and toggle end 15. Base 12 also includes a channel 20 formed at clamp end 14 and extending from clamp end 14 to platform 19. Portions 22 and 23 of base 12 at sides 17 and 18, respectively, extend from clamp end 14 to platform 19, define channel 20 and act as guide rails. A guide holder 25 extends substantially perpendicularly upwardly from platform 19. Guide holder 25 includes an inwardly facing vertical slot 26, proximate side 17 and an inwardly facing vertical slot 27, proximate side 18, each extending upwardly from platform 19. While base 12 preferably includes a planar bottom to allow it to be placed and used on a work surface, it will be understood that base 12 can have substantially any bottom to allow it to be placed on a surface or fixed to a surface such as with brackets, pegs and the like.

Figure 3:
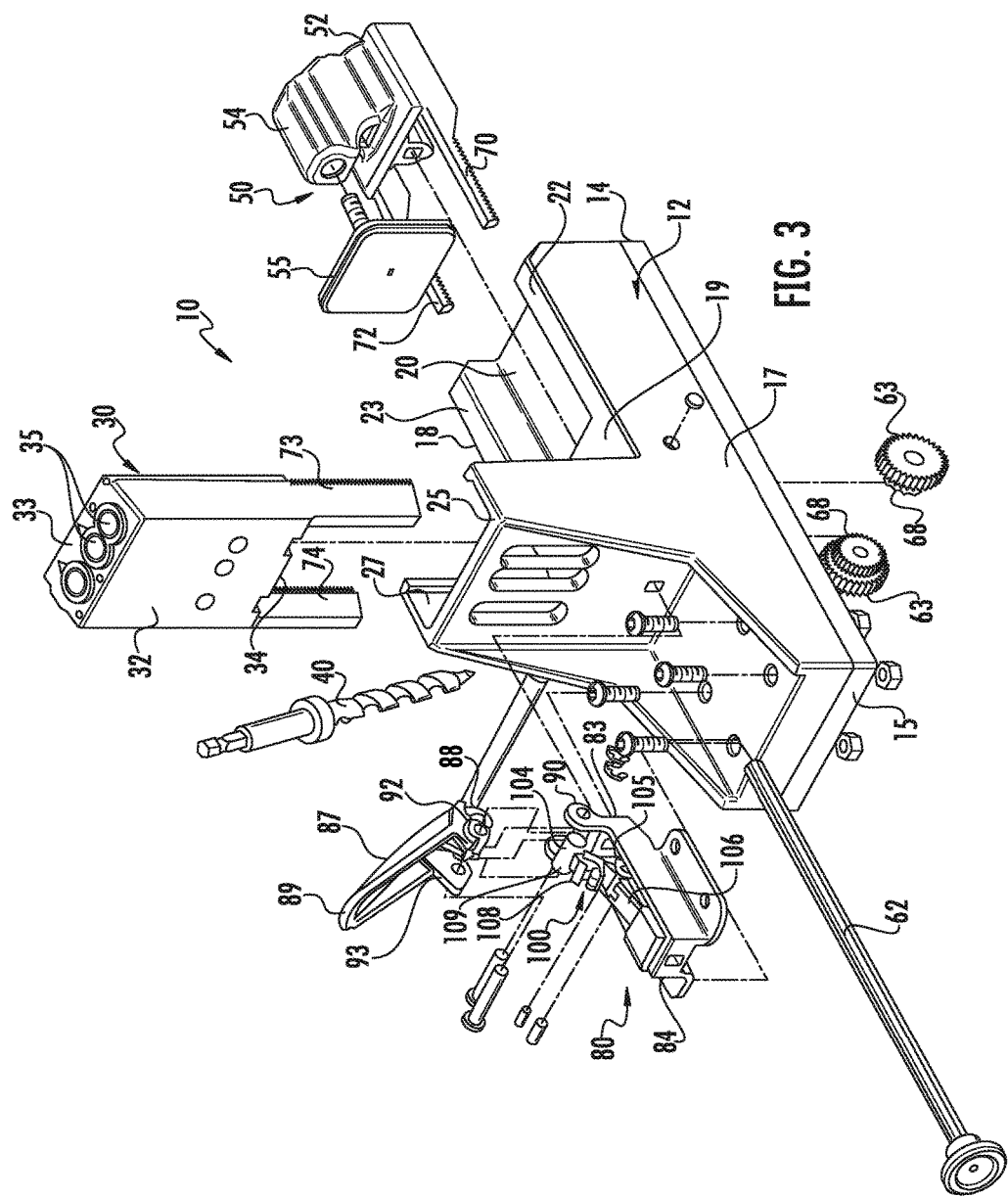
FIG. 3 is an exploded perspective view of the self-adjusting pocket hole jig of FIG. 1.
Figure 4:
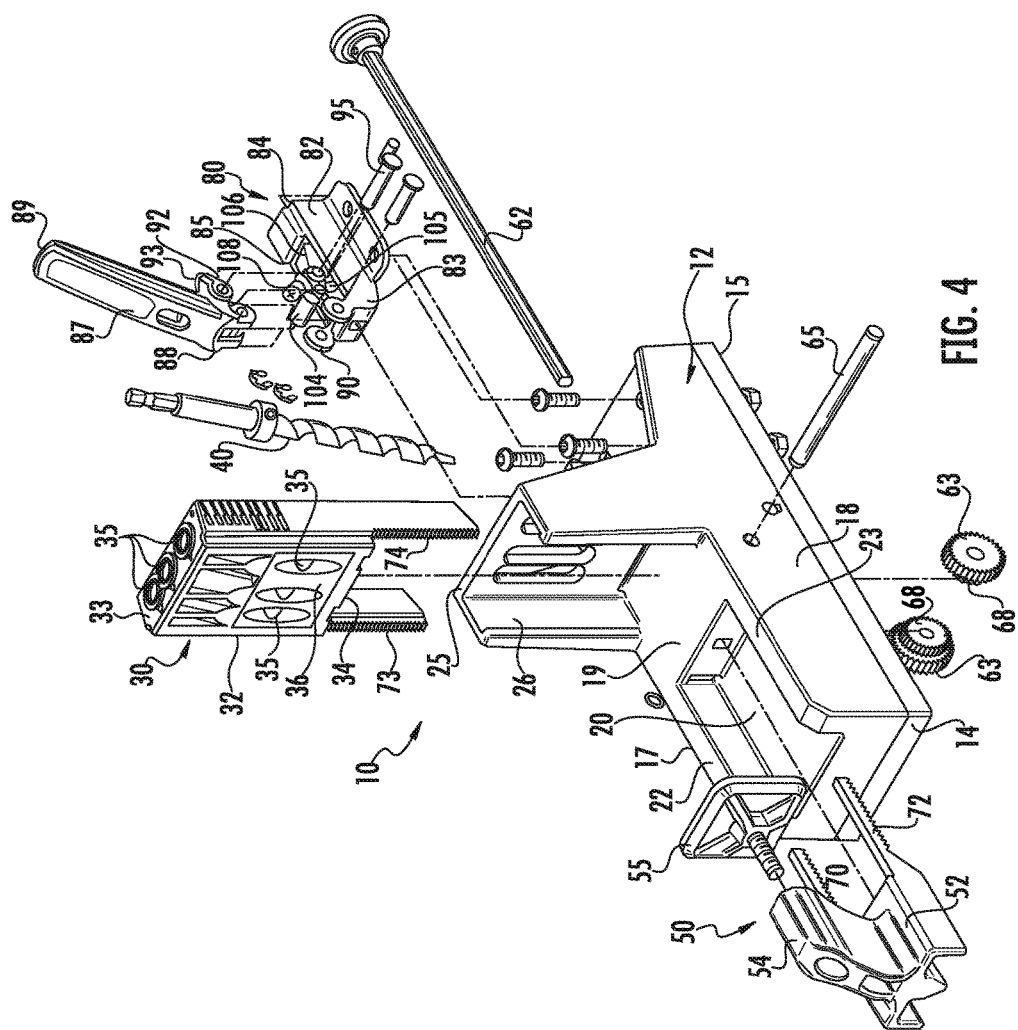
FIG. 4 is an exploded reversed perspective view of the self-adjusting pocket hole jig of FIG. 3.

Still referring to FIGS. 1 and 2 with additional reference to FIGS. 3 and 4, jig 10 also includes a guide 30 carried by guide holder 25 and reciprocally movable vertically along slots 26 and 27 in an upward direction and a downward direction between a raised position and a lowered position, respectively. Guide 30 includes a body 32 having a top 33, a bottom 34 and at least one and preferably two or more guide channels 35 extending therethrough from top 33 to a surface 36 above bottom 34. Guide channels 35 are disposed to receive and guide the shank of a drill bit 40 (FIGS. 3 and 4). A clamp assembly 50 is carried within channel 20 of base 12. Clamp assembly 50 includes a carriage 52 reciprocally movable within channel 20 between an engaged position (clamping a workpiece) and a disengaged position (releasing a workpiece), and a clamp arm 54 positioned above and carried by carriage 52. In the preferred embodiment, the disengaged position is when carriage 52 is moved in a rearward direction away from guide 30, toward end 14 (also referred to as a rearward position). The engaged position is when carriage 52 is moved in a forward direction toward guide 30, away from end 14 (also referred to as a forward position). Clamp arm 54 is directed towards toggle end 15 and terminates in a foot element 55. Foot element 55 engages a work piece to hold the work piece on platform 19 abutting surface 36 of guide 30 with carriage 52 in the engaged position.

Figure 5:
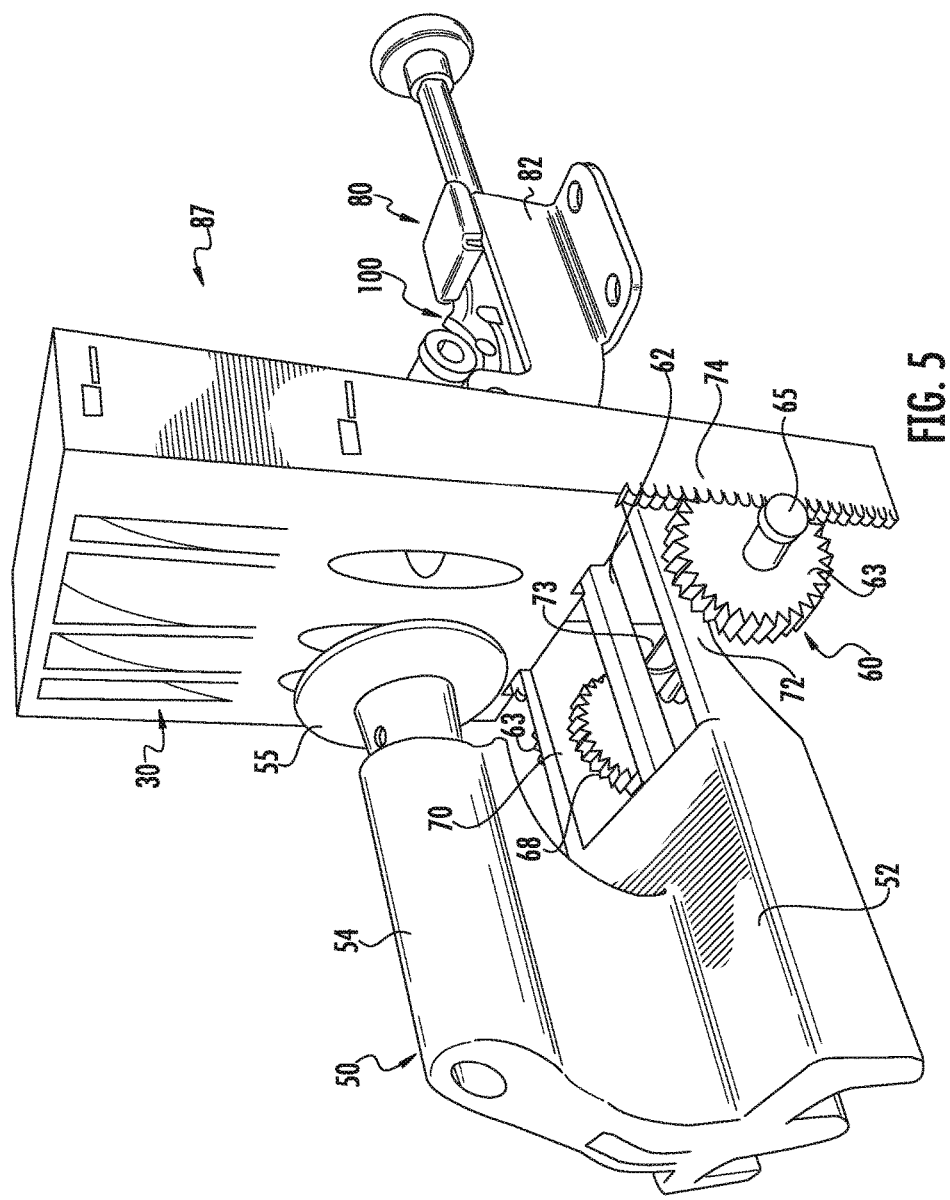
FIG. 5 is a perspective view of the jig with the base removed to show the adjustment mechanism in the lowered position.
Figure 6:
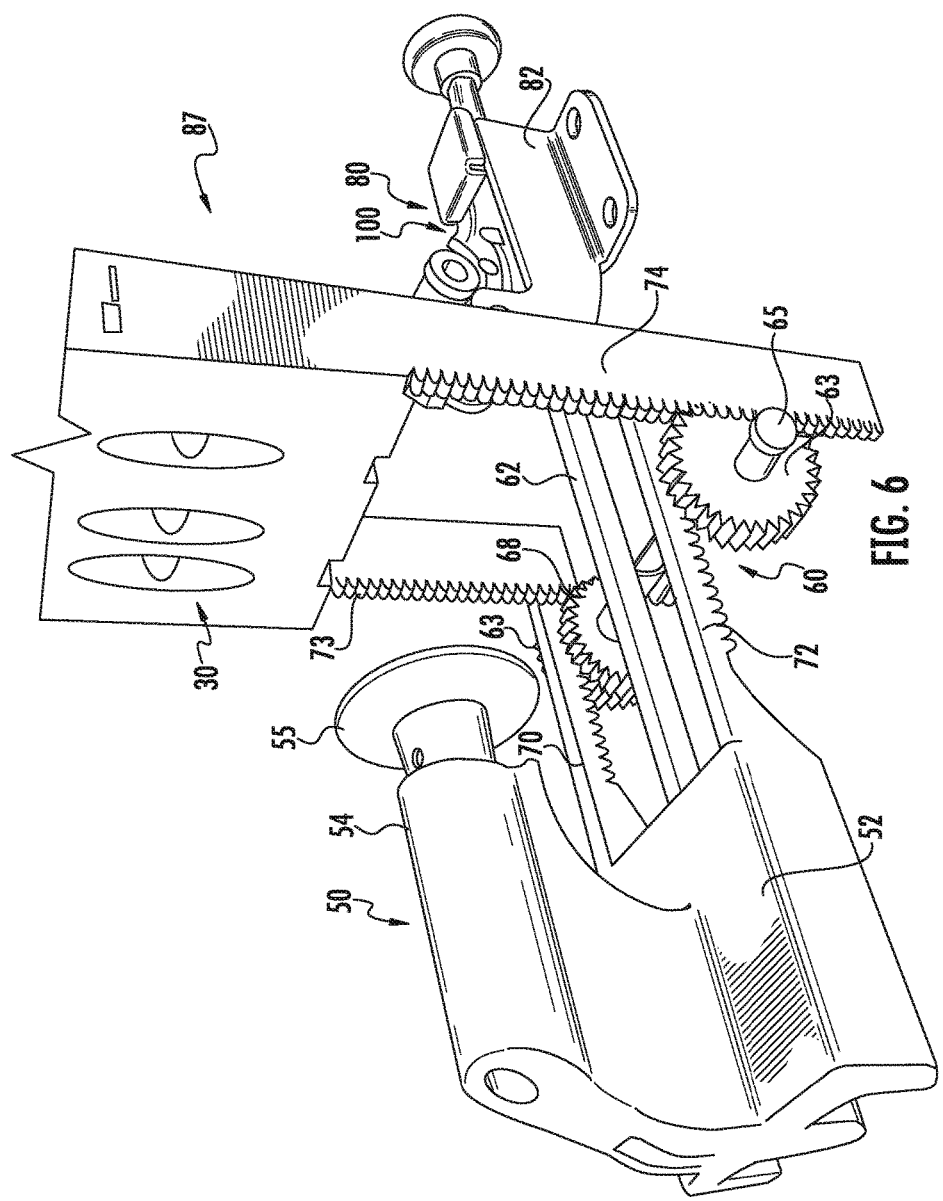
FIG. 6 is a perspective view of the jig with the base removed to show the adjustment mechanism in the raised position.

With additional reference to FIGS. 5 and 6, clamp assembly 50 is reciprocally movable between the forward position (FIGS. 1 and 5) and the rearward position (FIGS. 2 and 6) by an adjustment mechanism 60. Guide 30 is also movable between the lowered position (FIGS. 1 and 5) and the raised position (FIGS. 2 and 6) by adjustment mechanism 60 contemporaneous with the movement of clamp assembly 50. Thus, when clamp assembly 50 is moved in a forward direction guide 30 is correspondingly moved in a downward direction, and when clamp assembly 50 is moved in a rearward direction guide 30 is correspondingly moved in an upward direction. Adjustment mechanism 60 includes a bar 62 extending from toggle end 15 under platform 19 and into channel 20. Bar 62 fixedly engages carriage 52 of clamp assembly 50. When bar 62 is pushed longitudinally toward clamp end 14, clamp assembly 50 is moved toward the rearward position. When bar 62 is pulled longitudinally away from the clamp end, clamp assembly 50 is moved toward the forward position. To make movement of guide member 30 contemporaneous with movement of clamp assembly 50, turning the horizontal linear movement of clamp assembly 50 in vertical linear movement of guide 30, a translation mechanism is used. In this embodiment, the translation mechanism, a part of adjustment mechanism 60 includes a rack and pinion system. A double set of pinions (circular gears) are employed. A set of guide pinions 63 are carried by a pin 65 extending transversely through base 12 from side 17 to side 18. Guide pinions 63 are spaced apart and each positioned adjacent one of sides 17 and 18. A set of clamp pinions 68 are carried by pin 65 and are spaced apart and each positioned inside and adjacent to one of guide pinions 63. Guide pinions 63 and clamp pinions 68 rotate together, so that either the adjacent pinions are fixed together, or they are each fixed to pin 65 so as to rotate together. Clamp racks 70 and 72 (linear gears) extend forwardly from carriage 52 within channel 20 toward toggle end 15. Clamp racks 70 and 72 are spaced apart and parallel and engage clamp pinions 68. Guide racks 73 and 74 extend downwardly from bottom 34 on opposing sides of body 32. Racks 73 and 74 are received down through slots 26 and 27, respectively to a position below platform 19 to engage guide pinions 63.

Therefore, as bar 62 moves clamp assembly 50, clamp racks 70 and 72 rotate clamp pinions 68. The rotation of clamp pinions 68 also results in the rotation of guide pinions 63. The rotation of guide pinions 63 translates into linear motion of guide racks 73 and 74, moving guide 30 contemporaneously with movement of clamp assembly 50. Guide pinions 63 and clamp pinions 68 can have different diameters to provide a proportional change from linear motion to rotational motion and back to linear motion. In this manner, the distance of the horizontal linear movement of clamp assembly 50 by bar 62 is proportionately translated to a vertical linear movement of guide 30. This translation can be fixed to a specific ratio of pinions so that as clamp assembly 50 is moved to a distanced from guide 30 to accommodate a work piece having a specific thickness, guide 30 self-adjusts, and is raised to a height with the correct proportions relative the thickness of the workpiece for positioning a pocket hole. A 7/10 gear ratio is preferred, but it will be understood that other ratios can be employed to achieve the desired movement of guide 30 in relation to clamp assembly 50.

Referring specifically to FIGS. 3 and 4, bar 62 is held in position by a toggle mechanism 80 carried by base 12 proximate toggle end 15. A toggle mounting body 82 is coupled to base 12, and includes opposing ends 83 and 84, and an elongated channel 85. An elongated actuating lever 87 includes an end 88 pivotally coupled to mounting body 82 proximate end 83 above elongated channel 85 at a pivot point 90 and an opposing end 89. Actuating lever 87 includes, in this specific embodiment, a pivot point 92 extending between two parallel projections 93 extending downwardly from actuating lever 87 intermediate end 88 and end 89. The two parallel projections 93 are spaced apart at pivot point 92 to form a mounting yoke that is positioned on both sides of a link, with a pivot pin 95 extending through both parallel projections 93 and the link, which will be described presently.

Still referring to FIGS. 3 and 4, bar 62 passes through elongated channel 85 of body 82. A self-adjusting toggle mechanism 100 generally includes three pivotally linked elements designated element 104, cam element 105, and locking element 106. Element 104 has an elongated body with the rearward end pivotally attached between spaced apart parallel projections 93 of actuating lever 87 at pivot point 92. The forward end of element 104 is bifurcated and the rearward end of cam element 105 is pivotally mounted in the bifurcation. Also, the forward end of element 104 has a vertically upwardly extending boss 108 formed thereon with a horizontally extending (generally parallel to element 104) threaded opening therethrough. An adjustment screw 109 is threadedly engaged in the opening and is oriented so that the forwardly extending end is movable. The front end of cam element 105 is pivotally engaged in a bifurcated rearward end of locking element 106 and the front end of locking element 106 is slideably engaged over bar 62. The front end of cam element 105 defines an upwardly and forwardly facing pressure adjustment surface positioned to engage the front end of adjustment screw 109 and adjust downward pivotal movement of self adjusting toggle mechanism 100.

Actuating lever 87 is movable between an opened position and a closed position to clamp a work piece between clamp assembly 50 and guide 30. In the opened position of actuating lever 87, bar 62 is movable to adjust the position of clamp assembly 50 against a work piece. Locking element 106 is positioned for sliding movement in relation to bar 62. In the open position, bar 62 is manually pulled so that foot 55 engages the work piece. Contemporaneously, guide 30 is raised or lowered to the corresponding proportional height for the thickness of the workpiece. In response to pivotal movement of actuating lever 87 toward base 12, pressure foot 55 is moved toward guide 30 until it engages the work piece disposed on platform 19 and element 104 pivots, which causes cam element 105 to pivot toward bar 62 at the union of elements 105 and 106. As element 104 and 105 pivot, locking element 106 moves toward bar 62 and the angular disposition of cam element 105 and element 104 relative to bar 62 progressively lessens. With pressure foot 55 engaged against the work piece, continued movement of actuating lever 87 toward base 12 drives toggle mechanism 50, causing locking element 106 to slide forwardly and elements 104 and 105 to pivot toward bar 62 until the point at which the bottom surface of cam element 105 bears against bar 62. At the point of contact between cam element 105 and bar 62, cam element 105 pivots ever so slightly away from bar 62 and drives locking element 106 away from bar 62 at the junction of elements 105 and 106, which causes locking element 106 to cant and thus frictionally engage bar 62. Cam element 105 thus acts as a lever, driving locking element 106 so as to cause it to cant and frictionally engage bar 62 in response to the force applied to actuating lever 87 in a direction toward base 12, which force is transferred to cam element 105 by element 104. This frictional engagement frictionally locks locking element 106 to bar 62. In response to continued force applied to actuating lever 87 toward base 12 and with locking element 106 frictionally locked against bar 62, a clamping pressure is applied by pressure foot 55 to the work piece. In the closed position of actuating lever 87, an over-the-center locking occurs at element 104 in relation to the pivoting action that takes place between actuating lever 87 and element 104 and between element 104 and cam element 515, thus locking actuating lever 87 in the closed position. This process takes place regardless of the size of the work piece positioned between pressure foot 55 and guide 30 because of the self adjusting feature. This structure is not described in further detail as it is fully described in U.S. Pat. No. 9,211,635, entitled SELF-ADJUSTING BAR CLAMP, filed Aug. 1, 2014 and issued Dec. 15, 2015, incorporated herein by reference. While a self-adjusting toggle mechanism is employed in the preferred embodiment, it will be understood that other types of locks or conventional toggle mechanisms, and the like can be employed to retain bar 62 in position.

Figure 7:
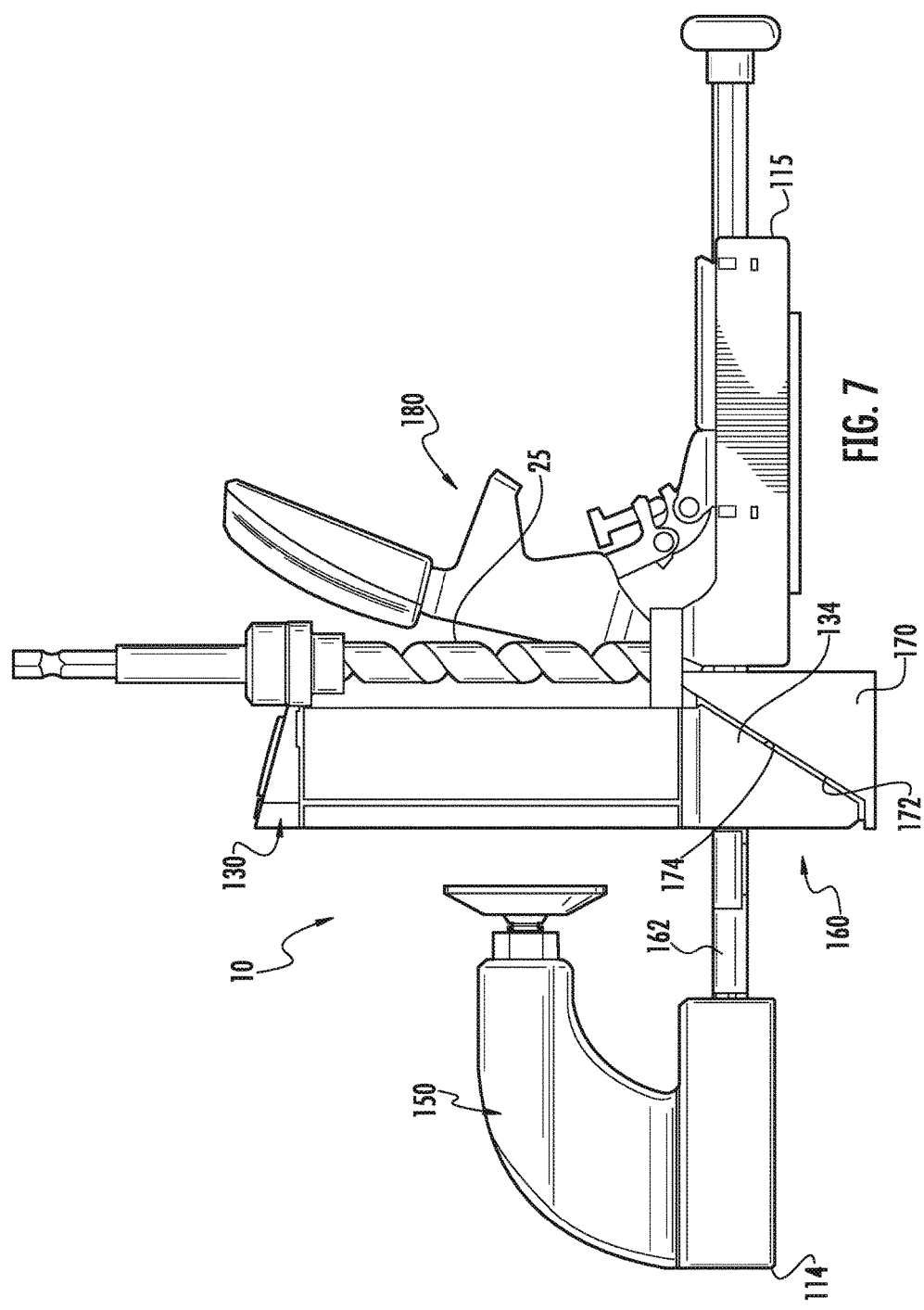
FIG. 7 is a side elevation view of another embodiment of a self-adjusting pocket hole jig in accordance with the present invention, in a lowered position.
Figure 8:
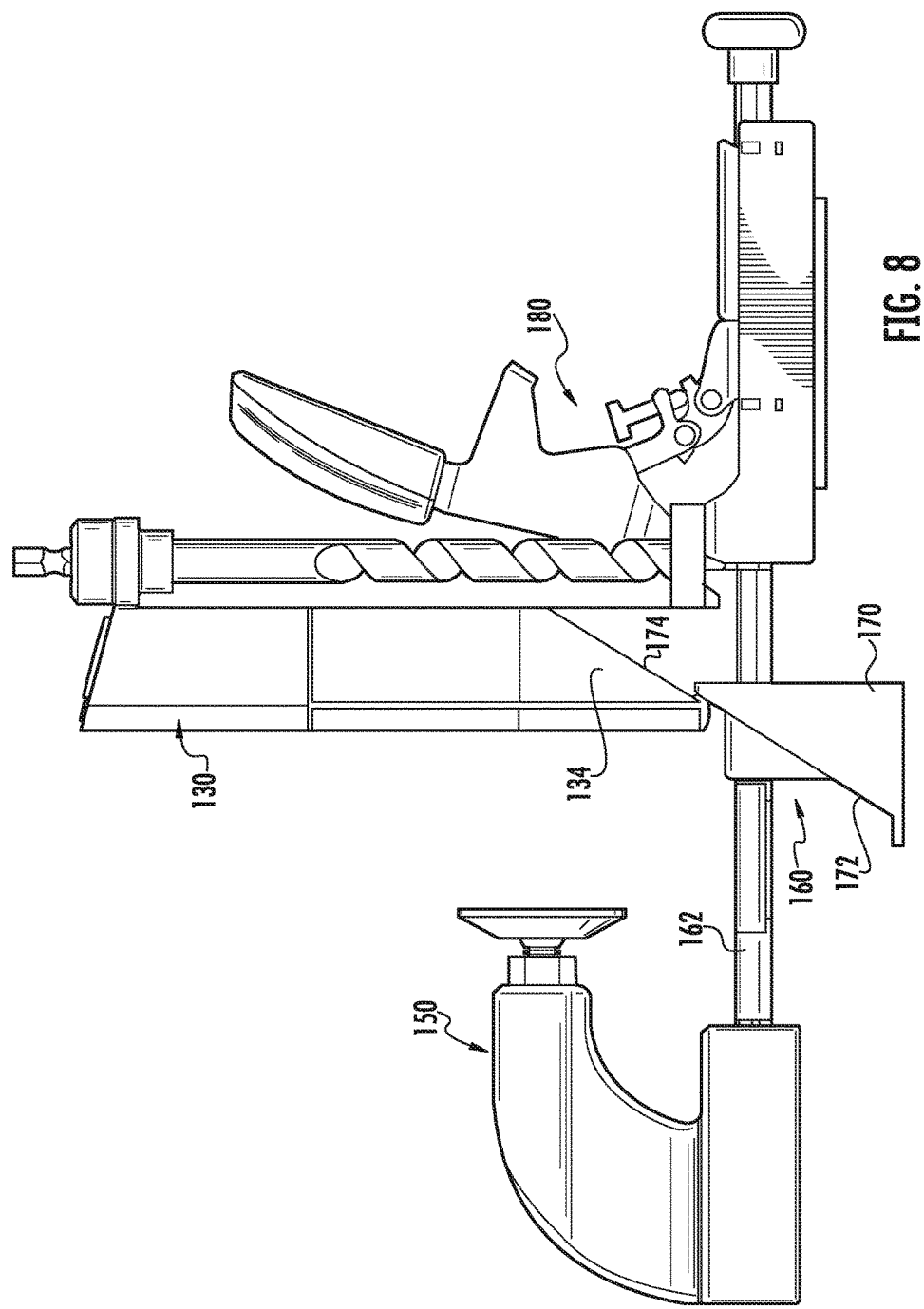
FIG. 8 is a perspective view of the self-adjusting pocket hole jig of FIG. 7, in a raised position.

Turning now to FIGS. 7 and 8, a self-adjusting pocket hole jig generally designated 110 is illustrated. Jig 110 is substantially identical to jig 10, with an adjustment mechanism 160 replacing adjustment mechanism 60. In this embodiment, horizontal linear movement is translated to vertical linear movement by translation mechanism different than that described previously. The translation mechanism, a part of adjustment mechanism 160 includes wedges instead of rack and pinion gears. Jig 110 includes a clamp end 114 and a toggle end 115. A bar 162 passes through a self-adjusting toggle mechanism 180 and is coupled to a clamp assembly 150. A wedge block 170 having a sloped surface 172 facing towards clamp assembly 150 is fixedly carried by bar 162 underlying and engaging a guide 130. A bottom 134 of guide 130 is formed into a wedge shape with a sloped surface 174 facing away from clamp assembly 150. Sloped surface 172 and sloped surface 174 are in a parallel and abutting relationship. As wedge block 170 is moved toward clamp end 114, wedge block 170 slides along sloped surface 174 of guide 130, forcing guide 130 upwardly. As wedge block 170 is moved away from clamp end 114, sloped surface 174 slides down sloped surface 172 of wedge block 170, lowering guide 130. Thus, the movement of guide 130 is contemporaneous with the movement of clamp assembly 150. The relative movements of clamp assembly 150 and guide 130 can be adjusted by altering the angle of sloped surfaces 172 and 174.

Figure 9:
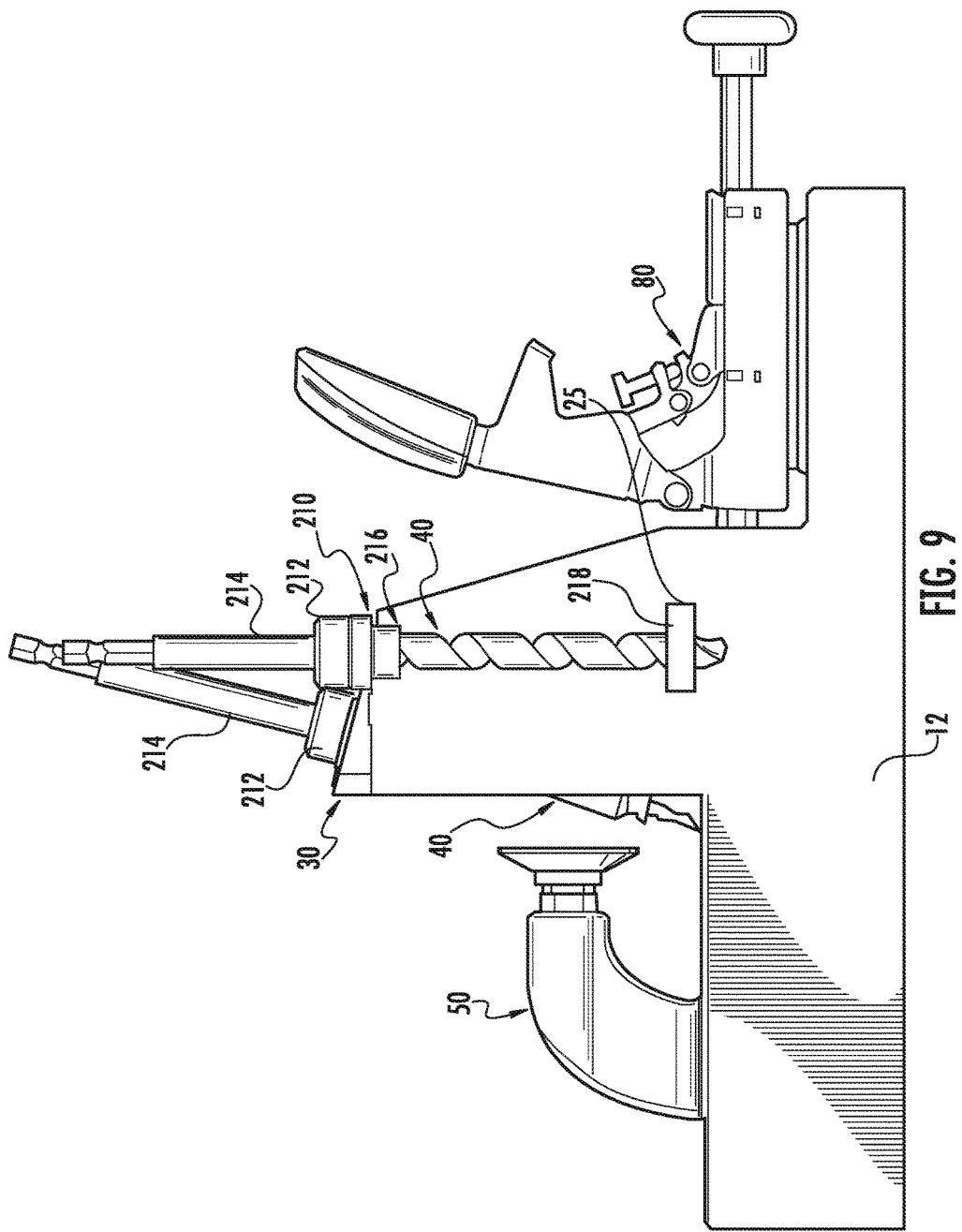
FIG. 9 is a side elevation illustrating the jig with a drill bit length device in a lowered position.
Figure 10:
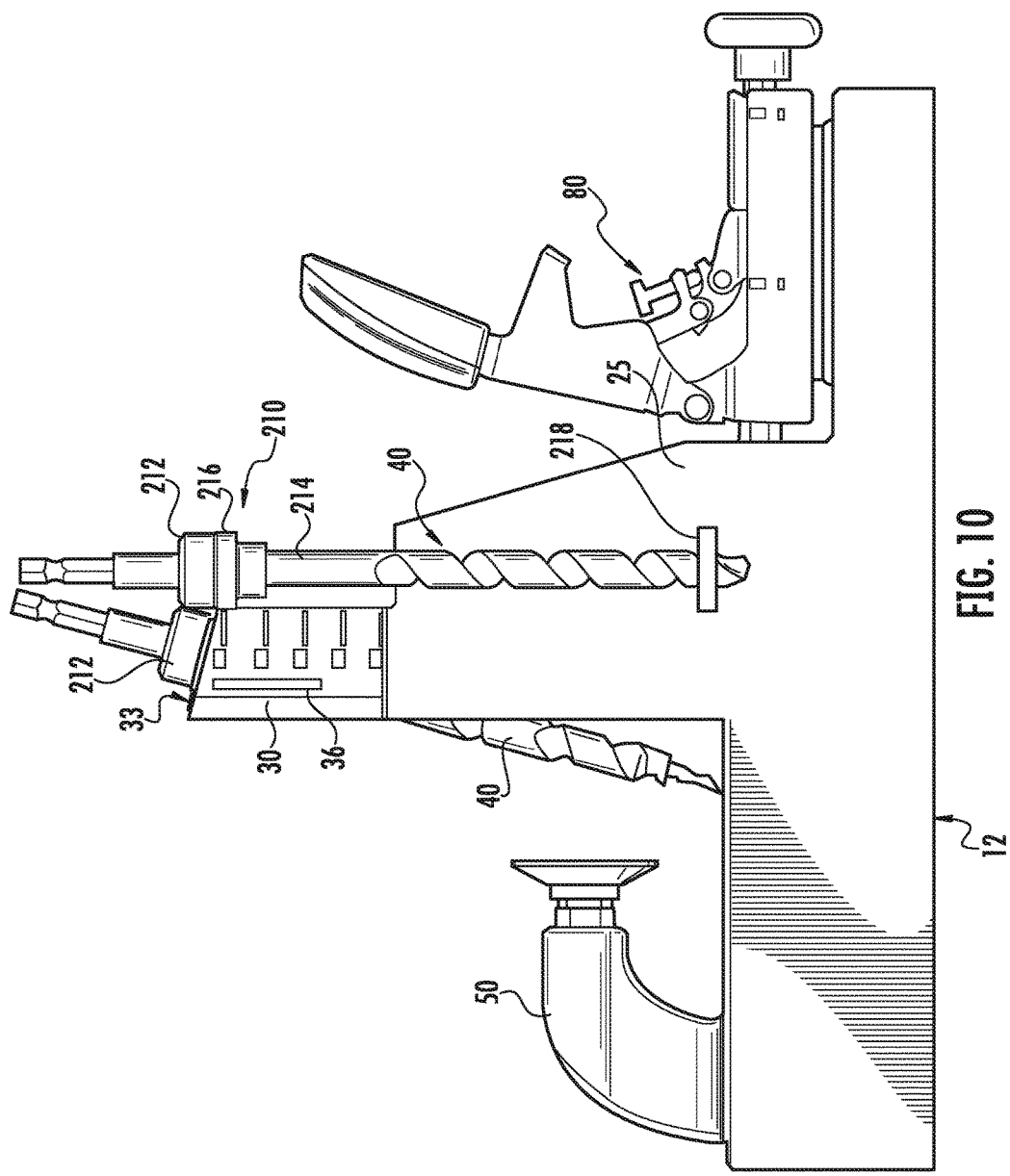
FIG. 10 is a side elevation illustrating the jig with the drill bit length device in a raised position.
Figure 11C:
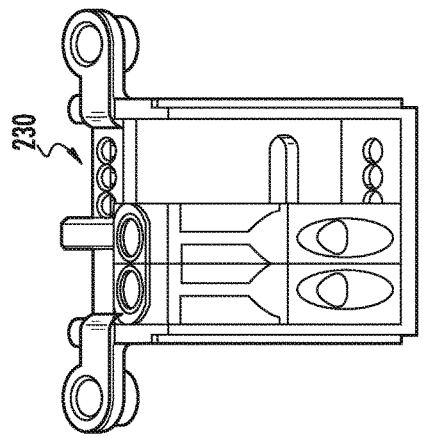
FIGS. 11a-11f illustrate a guide.
Figure 11F:
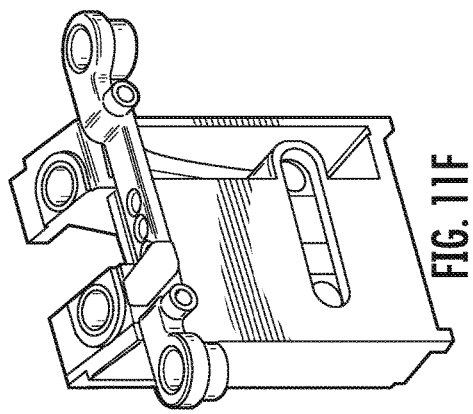
Figure 11B:
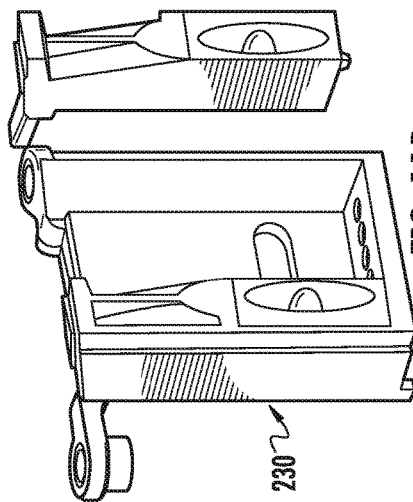
Figure 11E:
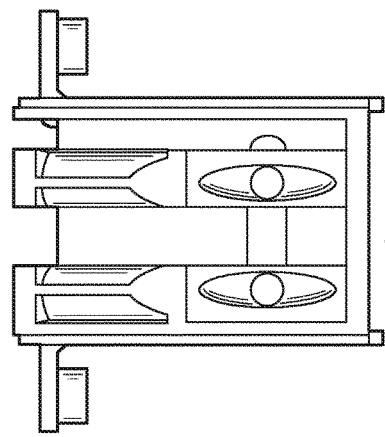
Figure 11A:
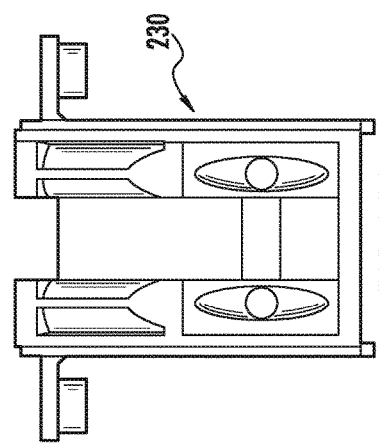
Figure 11D:
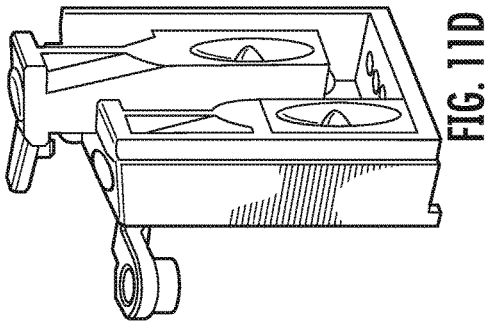

Referring now to FIGS. 9 and 10, jig 10 is illustrated including a drill bit length device 210 for establishing the length of a drill bit 40 for the drilling depth to be used with jig 10 at the setting employed. It will be understood that drill bit length device 210 can be used with jig 110 or jig 10. FIG. 9 illustrates guide 30 in the lowered position. As can be seen, a drill bit 40 extends through guide 30 and out past surface 36 the correct distance for forming a pocket hole in a work piece. Drill bit 40 can only extend a distance limited by a collar 212 fastened to the shank 214 of drill bit 40. To properly position collar 212, drill bit 40 is positioned through adjustment ring 116 extending from top 33 of guide 30 and received by tip receptacle 118 extending from the side of guide holder 25. The distance between adjustment ring 116 and tip receptacle 118 varies with the raised distance of guide 30. For thin work pieces, clamp assembly 50 is close to guide 30, and guide 30 is in a lowered position (FIG. 9). A shallower pocket hole is required, and this distance is provided by the distance between adjustment ring 116 and tip receptacle 118 being shorter to match the required distance. When a thicker work piece is employed, clamp assembly 50 is further away from guide 30, resulting in an increased or raised height of guide 30 (FIG. 10). The raised height increases the distance between adjustment ring 116 and tip receptacle 118, providing the exact length needed for drill bit 40. When drill bit 40 is positioned in drill bit length device 210 with the jig clamping a work piece, the proper drill bit length is at the top of adjustment ring 216. Collar 212 is positioned over shank 214 abutting adjustment ring 216 and tightened into place on shank 214 such as by using a set screw. When the drill bit is removed an inserted through guide channel 35 of guide 30, the drill depth is set appropriate to the work piece being used.

Turning now to FIGS. 11a-11f, a guide 230 is illustrated. Guide 230 includes at least one and preferably two or more guide channel elements 232 selectively positionable within a guide body 233. By positioning guide elements 232 in different locations within guide body 233, the location, number and spacing of pocket holes can be adjusted as desired. Guide 230 is receivable and operable in the same manner as guide 30 described previously. It can also be modified to include a wedge bottom to operate in a manner similar to guide 130.

Figure 12:
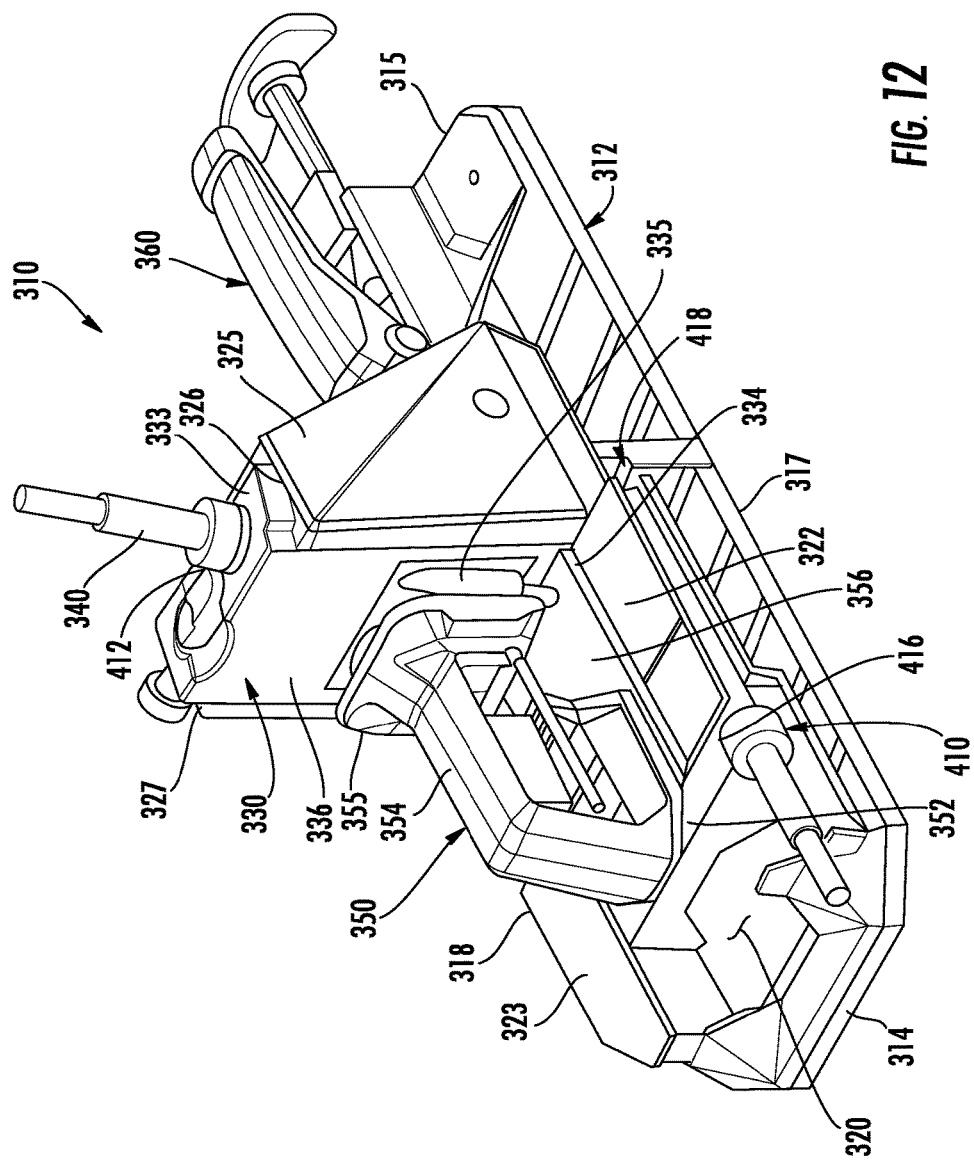
FIG. 12 is a perspective view of another embodiment of a self-adjusting pocket hole jig.
Figure 13:
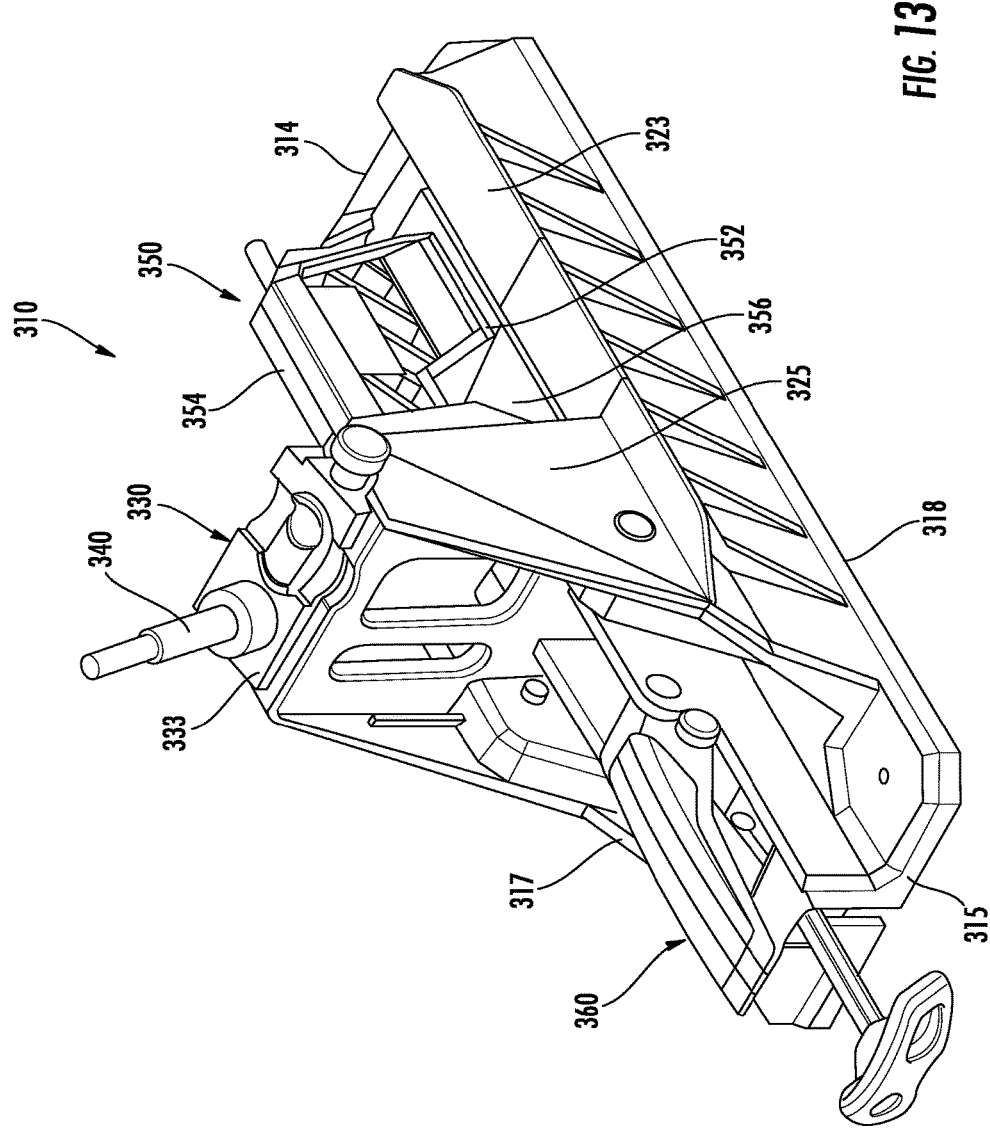
FIG. 13 is a reversed perspective view of the self-adjusting pocket hole jig of FIG. 12.

Turning now to FIGS. 12 and 13, a self-adjusting pocket hole jig generally designated 310 is illustrated. Jig 310 is substantially identical to jig 10 and 110, including either adjustment mechanism 60 or adjustment mechanism 160. In this embodiment, the difference is the platform 19 upon which a workpiece rests. This platform 19 is not present in jig 310. Self-adjusting pocket hole jig 310 includes a base 312 having a clamp end 314, a toggle end 315, opposing sides 317 and 318 and a guide holder 325 extending from base 312 and positioned intermediate clamp end 314 and toggle end 315. Base 312 also includes a channel 320 formed at clamp end 314 and extending from clamp end 314 to guide holder 325. Portions 322 and 323 of base 312 at sides 317 and 318, respectively, extend from guide holder 325 toward clamp end 314, define channel 320 and act as guide rails. Guide holder 325 extends substantially perpendicularly upwardly and includes an inwardly facing vertical slot 326, proximate side 317 and an inwardly facing vertical slot 327, proximate side 318. While base 312 preferably includes a planar bottom to allow it to be placed and used on a work surface, it will be understood that base 312 can have substantially any bottom to allow it to be placed on a surface or fixed to a surface such as with brackets, pegs and the like.

Figure 14:
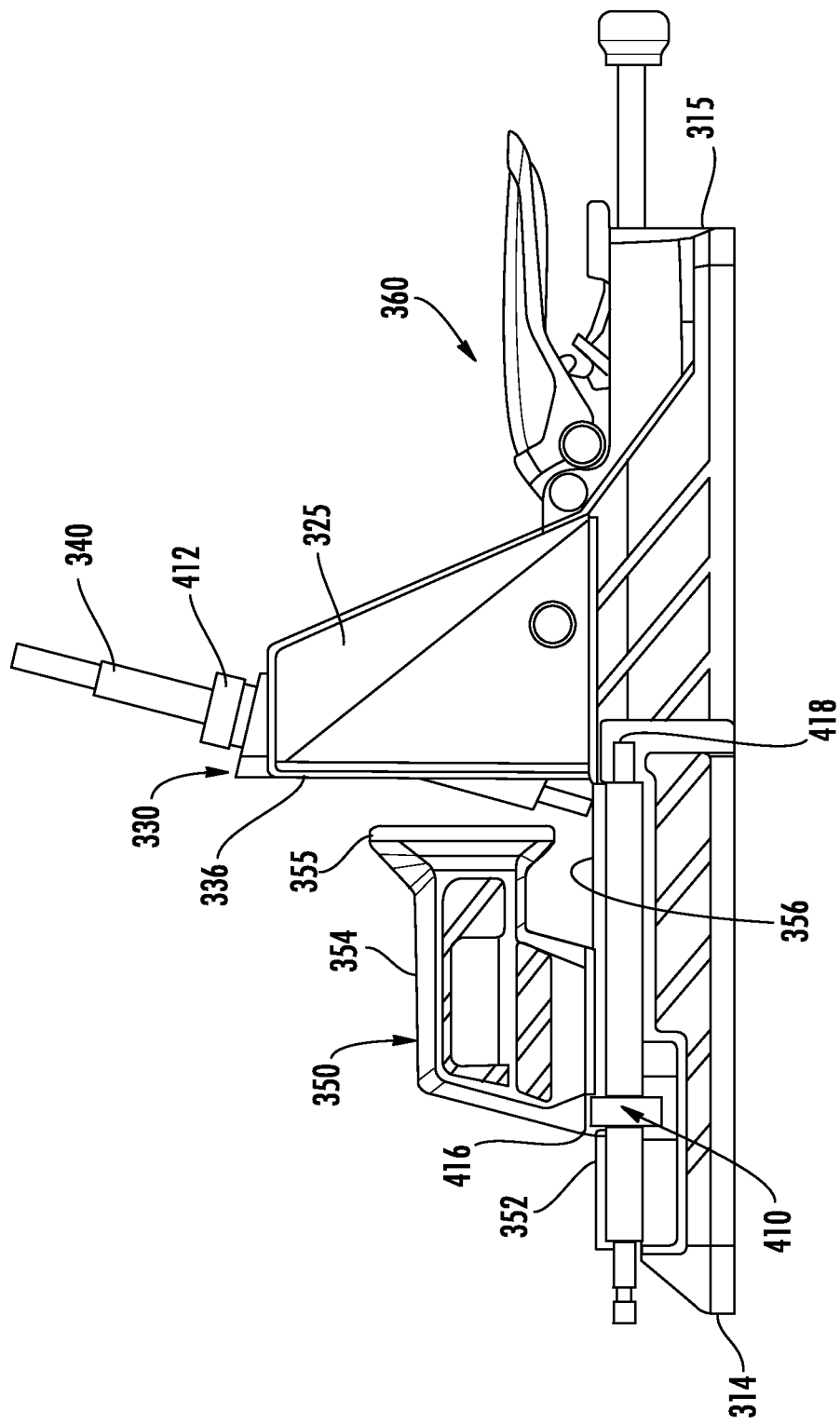
FIG. 14 is a side view of the self-adjusting pocket hole jig of FIGS. 12 and 13.

Still referring to FIGS. 12 and 13 with additional reference to FIG. 14, jig 310 also includes a guide 330 carried by guide holder 325 and reciprocally movable vertically along slots 326 and 327 in an upward direction and a downward direction between a raised position and a lowered position, respectively. Guide 330 includes a body 332 having a top 333, a bottom 334 and at least one and preferably two or more guide channels 335 extending therethrough from top 333 to a clamping surface 336 extending from top 333 to bottom 334 and facing clamp end 314. Guide channels 335 are disposed to receive and guide the shank of a drill bit 340.

A clamp assembly 350 is carried within channel 320 of base 312. Clamp assembly 350 includes a carriage 352 reciprocally movable within channel 320 between an engaged position (clamping a workpiece) and a disengaged position (releasing a workpiece), a clamp arm 354 positioned above and carried by carriage 352 and a platform 356. In the preferred embodiment, the disengaged position is when carriage 352 is moved in a rearward direction away from guide 330, toward end 314 (also referred to as a rearward position). The engaged position is when carriage 352 is moved in a forward direction toward guide 330, away from end 314 (also referred to as a forward position). Clamp arm 354 is directed towards toggle end 315 and terminates in a foot element 355. Foot element 355 engages a work piece to hold the work piece on platform 356 abutting surface 336 of guide 330 with carriage 352 in the engaged position. Here is should be noted that platform 356 moves with carriage 352, above portions 322 and 323, so that a workpiece is only carried by platform 356 and does not engage portions 322 and 323. This allows the workpiece to move with the platform 356 as carriage 352 is moved from the rearward position (disengaged position) to an engaged position. Additionally, clamp face 336 of guide 330 extends outwardly toward clamp end 314 past guide holder 325 to receive a workpiece thereagainst. This prevents any spacing between guide 330 and a workpiece, since the workpiece is directly clamped against clamp face 330 alone and does not contact guide holder 325. Platform 356 slides under guide 330 as carriage 352 is moved towards guide 330 and terminates abutting guide 330 is the rearward or disengaged position.

As with the previous embodiments, in jig 310, clamp assembly 350 is reciprocally movable between the forward position and the rearward position by an adjustment mechanism 360, which in the embodiment shown is the same as mechanism 60. Guide 330 is also movable between the lowered position and the raised position by adjustment mechanism 360 contemporaneous with the movement of clamp assembly 350. Thus, when clamp assembly 350 is moved in a forward direction, guide 330 is correspondingly moved in a downward direction, and when clamp assembly 350 is moved in a rearward direction guide 330 is correspondingly moved in an upward direction. It will be understood that adjustment mechanism 360, can also be the same as adjustment mechanism 160.

Referring now to FIGS. 12 and 14, jig 310 is illustrated including a drill bit length device 410 for establishing the length of a drill bit 340 for the drilling depth to be used with jig 310 at the setting employed. It will be understood that drill bit length device 410 can also be used with jig 110 or jig 10. Drill bit 440 can only extend a distance through guide channels 335 limited by a collar 412 fastened to drill bit 340. To properly position collar 412, drill bit 340 is positioned through an adjustment ring or notch 416 extending from or formed in carriage 352 and received by tip receptacle 418 extending from base 312 proximate the side of guide holder 325. The distance between adjustment ring 416 and tip receptacle 418 varies with the position of carriage 352. For thin work pieces, clamp assembly 350 is close to guide 330. A shallower pocket hole is required, and this distance is provided by the distance between adjustment ring 416 and tip receptacle 418 being shorter to match the required distance. When a thicker work piece is employed, clamp assembly 350 is further away from guide 330, increasing the distance between adjustment ring 416 and tip receptacle 418, providing the exact length needed for drill bit 340. When drill bit 340 is positioned in drill bit length device 410 with the jig clamping a work piece, the proper drill bit length is at the top of adjustment ring 416. Collar 412 is positioned over drill bit 340 abutting adjustment ring 416 and tightened into place such as by using a set screw. When the drill bit is removed an inserted through guide channel 335 of guide 330, the drill depth is set appropriate to the work piece being used.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A pocket hole jig comprising:
   a base having a clamp end and a toggle end;
   a guide carried by the base intermediate the clamp end and the toggle end;
   a clamp assembly carried by the base intermediate the clamp end and the guide, and reciprocally movable between an engaged position when moved toward the guide and a disengaged position when moved away from the guide, the clamp assembly including:
     a carriage slidably carried by the base;
     a clamp arm extending above and carried by carriage;
     a foot coupled to the clamp arm for engaging a workpiece; and
     a platform extending from the carriage overlying the base for receiving a workpiece and preventing the workpiece from contacting the base; and
   an adjustment mechanism coupled to the clamp assembly to move the clamp assembly in a forward direction to the engaged position and in a rearward direction to the disengaged position.

2. The pocket hole jig as claimed in claim 1 wherein the adjustment mechanism comprises:

a bar having a first end coupled to the clamp assembly and a second end extending from the clamp assembly under the guide to a position proximate the toggle end; and a toggle mechanism carried by the base proximate the toggle end, the toggle mechanism receives the second end of the bar and is movable between a closed position, holding the bar immovable, and an open position allowing sliding movement of the bar.

3. The pocket hole jig as claimed in claim 1 wherein the guide carried by the base is reciprocally movable between a raised position and a lowered position, the guide including at least one guide channels.

4. The self-adjusting pocket hole jig as claimed in claim 3 further including a guide holder extending upwardly from the base intermediate the clamp end and the toggle end, the guide holder receiving and retaining the guide for reciprocal movement between the raised position and the lowered position.

5. The pocket hole jig as claimed in claim 4 wherein the guide has a clamp surface extending beyond the guide holder to engage a workpiece and prevent a workpiece from engaging the guide holder.

6. The pocket hole jig as claimed in claim 4 wherein the adjustment mechanism further includes a translation mechanism coupled between the guide and the clamp assembly, the translation mechanism being configured to move the guide in a downward direction to the lowered position when the clamp assembly is moved in a forward direction, and configured to move the guide in an upward direction to the raised position when the clamp assembly is moved in a rearward direction.

7. The pocket hole jig as claimed in claim 6 wherein the translation mechanism comprises:

a pin extending transversely through the base intermediate the clamp end and the toggle end;

a first guide pinion carried by an end of the pin;

a second guide pinion carried by the opposing end of the pin;

a first clamp pinion carried by the end of the pin and fixed to the first guide pinion to rotate therewith;

a second clamp pinion carried by the opposing end of the pin and fixed to the second guide pinion to rotate therewith;

a first clamp rack and a second clamp rack extend forwardly for opposing sides of the clamp assembly toward toggle end and engage the first clamp pinion and the second clamp pinion, respectively; and a first guide rack and a second guide rack extend downwardly from opposing sides of the guide and engage the first guide pinion and the second guide pinion, respectively;

wherein movement of the clamp assembly causes linear movement of the first and second clamp racks thereby rotating the first and the second clamp pinions, resulting in rotation of the first and second guide pinions, thereby moving the first and second guide racks in a linear motion perpendicular to the first and second clamp racks.

8. The self-adjusting pocket hole jig as claimed in claim 7 wherein the first and second guide pinions have a diameter larger than a diameter of the first and second clamp pinions.

9. The self-adjusting pocket hole jig as claimed in claim 8 wherein the ratio of the first and second clamp pinions to the first and second guide pinions is a 7/10 ratio.

10. The self-adjusting pocket hole jig as claimed in claim 6 wherein the translation mechanism comprises:

a wedge block having a sloped surface facing towards the clamp assembly fixedly carried by the bar underlying and engaging the guide; and a bottom of the guide formed into a wedge shape with a sloped surface facing away from the clamp assembly, the sloped surface of the wedge block and the sloped surface of the guide engaging in a parallel and abutting relationship;

wherein, as the wedge block is moved toward the clamp end, the wedge block slides along the sloped surface of the guide, forcing the guide upwardly, and as the wedge block is moved away from the clamp end the sloped surface of the guide slides down the sloped surface of the wedge block, lowering the guide.

11. The self-adjusting pocket hole jig as claimed in claim 6 further includes a drill bit length device comprising:

an adjustment ring extending from the carriage for receiving a drill bit therethrough; and a tip receptacle extending from the base proximate the guide holder for receiving the tip of the drill bit;

wherein the adjustment ring moves with the movement of the carriage, varying the distance from the tip receptacle and determining a length of the drill to be used.

12. The pocket hole jig as claimed in claim 11 further including a guide holder extending upwardly from the base intermediate the clamp end and the toggle end, the guide holder receiving and retaining the guide for reciprocal movement between the raised position and the lowered position.

13. The pocket hole jig as claimed in claim 12 wherein the guide has a clamp surface extending beyond the guide holder to engage a workpiece and prevent a workpiece from engaging the guide holder.

14. A pocket hole jig comprising:

a base having a clamp end and a toggle end;

a guide carried by the base intermediate the clamp end and the toggle end, and reciprocally movable between a raised position and a lowered position, the guide including at least one guide channels;

a clamp assembly carried by the base intermediate the clamp end and the guide, and reciprocally movable between an engaged position when moved toward the guide and a disengaged position when moved away from the guide, the clamp assembly including a carriage slidably carried by the base, a clamp arm extending above and carried by carriage, and a platform extending from the carriage overlying the base for receiving a workpiece and preventing the workpiece from contacting the base; and a translation mechanism coupled between the guide and the clamp assembly, the translation mechanism being configured to move the guide in a downward direction to the lowered position when the clamp assembly is moved in a forward direction, and configured to move the guide in an upward direction to the raised position when the clamp assembly is moved in a rearward direction.

15. The pocket hole jig as claimed in claim 14 further including a bar having a first end coupled to the clamp assembly and a second end extending from the clamp assembly under the guide to a position proximate the toggle end.

16. The pocket hole jig as claimed in claim 15 further including a toggle mechanism carried by the base proximate the toggle end, the toggle mechanism receives the second end of the bar and is movable between a closed position, holding the bar immovable, and an open position allowing sliding movement of the bar.

17. The self-adjusting pocket hole jig as claimed in claim 14 wherein the translation mechanism comprises:
- a pin extending transversely through the base intermediate the clamp end and the toggle end;
- a first guide pinion carried by an end of the pin;
- a second guide pinion carried by the opposing end of the pin;
- a first clamp pinion carried by the end of the pin and fixed to the first guide pinion to rotate therewith;
- a second clamp pinion carried by the opposing end of the pin and fixed to the second guide pinion to rotate therewith;
- a first clamp rack and a second clamp rack extend forwardly for opposing sides of the clamp assembly toward toggle end and engage the first clamp pinion and the second clamp pinion, respectively; and
- a first guide rack and a second guide rack extend downwardly from opposing sides of the guide and engage the first guide pinion and the second guide pinion, respectively;
- wherein movement of the clamp assembly causes linear movement of the first and second clamp racks thereby rotating the first and the second clamp pinions, resulting in rotation of the first and second guide pinions, thereby moving the first and second guide racks in a linear motion perpendicular to the first and second clamp racks.

18. The self-adjusting pocket hole jig as claimed in claim 17 wherein the first and second guide pinions have a diameter larger than a diameter of the first and second clamp pinions.

19. The self-adjusting pocket hole jig as claimed in claim 14 wherein the translation mechanism comprises:
- a wedge block having a sloped surface facing towards the clamp assembly fixedly carried by the bar underlying and engaging the guide; and
- a bottom of the guide formed into a wedge shape with a sloped surface facing away from the clamp assembly, the sloped surface of the wedge block and the sloped surface of the guide engaging in a parallel and abutting relationship;
- wherein, as the wedge block is moved toward the clamp end, the wedge block slides along the sloped surface of the guide, forcing the guide upwardly, and as the wedge block is moved away from the clamp end the sloped surface of the guide slides down the sloped surface of the wedge block, lowering the guide.

20. The self-adjusting pocket hole jig as claimed in claim 14 further includes a drill bit length device comprising:
- an adjustment ring extending from the carriage for receiving a drill bit therethrough; and
- a tip receptacle extending from the base proximate the guide holder for receiving the tip of the drill bit;
- wherein the adjustment ring moves with the movement of the carriage, varying the distance from the tip receptacle and determining a length of the drill to be used.

* * * * *